United States Patent [19]

Higuchi et al.

[11] Patent Number: 6,163,132
[45] Date of Patent: Dec. 19, 2000

[54] BATTERY CHARGING STATUS INDICATOR APPARATUS

[75] Inventors: Yoshinari Higuchi, Kanagawa; Hirotaka Hirano, Gifu, both of Japan

[73] Assignee: Sony Corporation, Tokyo, Japan

[21] Appl. No.: 09/221,463

[22] Filed: Dec. 28, 1998

[30] Foreign Application Priority Data

Dec. 29, 1997 [JP] Japan .................................... 9-369196

[51] Int. Cl.⁷ .................................................. H01M 10/46
[52] U.S. Cl. .................................... 320/132; 320/DIG. 21
[58] Field of Search .................................... 320/128, 132, 320/134, 136, 150, 153, DIG. 18, DIG. 21, FOR 142, FOR 147; 324/427, 428, 431, 433

[56] References Cited

U.S. PATENT DOCUMENTS

| | | | |
|---|---|---|---|
| 4,333,149 | 6/1982 | Taylor et al. ........................ | 320/149 X |
| 5,162,741 | 11/1992 | Bates .................................... | 320/150 X |
| 5,349,282 | 9/1994 | McClure ................................ | 320/136 |
| 5,539,318 | 7/1996 | Sasaki .................................... | 324/428 |
| 5,561,362 | 10/1996 | Kawamura et al. ..................... | 320/134 |
| 5,565,759 | 10/1996 | Dunstan . | |
| 5,596,260 | 1/1997 | Moravec et al. ............ | 320/DIG. 21 X |
| 5,600,230 | 2/1997 | Dunstan . | |
| 5,606,243 | 2/1997 | Sakai et al. ............................. | 320/134 |
| 5,751,134 | 5/1998 | Hoerner et al. ......................... | 320/124 |

*Primary Examiner*—Edward H. Tso
*Attorney, Agent, or Firm*—Frommer Lawrence & Haug, LLP.; William S. Frommer

[57] ABSTRACT

There is provided a charging apparatus comprising a charging circuit for charging a battery cell of a battery pack; a computing unit which is supplied with information on detected voltage of the battery cell and information on a quantity of accumulated charging current from the battery pack and information on power consumption of an electronic equipment using the battery pack; and a display unit for indicating the result of computation of the computing unit; and being arranged such that the computing unit calculates a present charged capacity of the battery cell being charged and an usable duration of the electronic equipment using the battery pack by the present charged capacity and indicates them on the display unit.

7 Claims, 4 Drawing Sheets

BATTERY CHARGING STATUS INDICATOR APPARATUS

BACKGROUND OF THE INVENTION

The present invention relates to a charging apparatus suitable for charging a battery pack used as a power supply of an electronic equipment such as a camera integrated video tape recorder (hereinafter referred to as a video camera), a portable telephone and a personal computer.

Hitherto, a battery pack composed of a secondary battery such as a lithium ion cell, a NiCd cell and a nickel hydrogen cell has been used as a power supply of an electronic equipment such as a video camera, a portable telephone and a personal computer.

Various charging apparatuses for charging a battery cell of such battery pack have been also proposed since the past. As a charging apparatus which is arranged so as to indicate charged capacity of the battery cell being charged, there has been one which discriminates and indicates whether or not the charged capacity of the battery cell has reached 90%.

However, such conventional charging apparatus has had a problem that its user is unable to know the charging state in detail because it gives no indication about percentage how far the battery cell being charged has been charged.

It also has had a problem that the user is unable to know the degree of charge, i.e., how far the battery cell has been charged, which enables an electronic equipment, e.g., a video camera, using the battery pack to be driven for how many hours at the present point of time of the charge and that electricity cannot be charged in a planned manner only for the shooting duration necessary for the user, thus taking a time for charging unnecessarily.

Although there has been a method of stopping to charge the battery cell of the battery pack on the way and of attaching the battery pack actually to an electronic equipment, e.g., a video camera, and turning on the power supply to confirm the remaining usable duration and the capacity of the battery cell, it has had a problem that it is cumbersome and is inconvenient for the user.

SUMMARY OF THE INVENTION

In view of such problems, it is an object of the present invention to provide a charging apparatus which allows the user to readily know a present charged capacity of a battery pack being charged and an usable duration of an electronic equipment using the battery pack being charged by the present charged capacity, thus improving the usability for the user.

In order to achieve the above-mentioned object, a present inventive charging apparatus comprises a charging circuit for charging a battery cell of a battery pack; a computing unit which is supplied with information on detected voltage of the battery cell and information on a quantity of accumulated charging current from the battery pack and information on power consumption of an electronic equipment using the battery pack; and a display unit for indicating the result of computation of the computing unit: and is arranged such that the computing unit calculates a present charged capacity of the battery cell being charged and an usable duration of the electronic equipment using the battery pack by the present charged capacity and indicates them on the display unit.

According to such invention, because it is arranged such that the computing unit calculates the present charged capacity of the battery cell being charged and the usable duration of the electronic equipment using the battery pack by the present charged capacity and indicates them on the display unit, the user can readily know the present charged capacity of the battery cell being charged and the usable duration of the electronic equipment using the battery pack being charged by the present charged capacity and can use the equipment conveniently.

The above and other advantages of the invention will become more apparent in the following description and the accompanying drawings in which like numerals refer to like parts.

DESCRIPTION OF PREFERRED EMBODIMENTS

Figure 1:
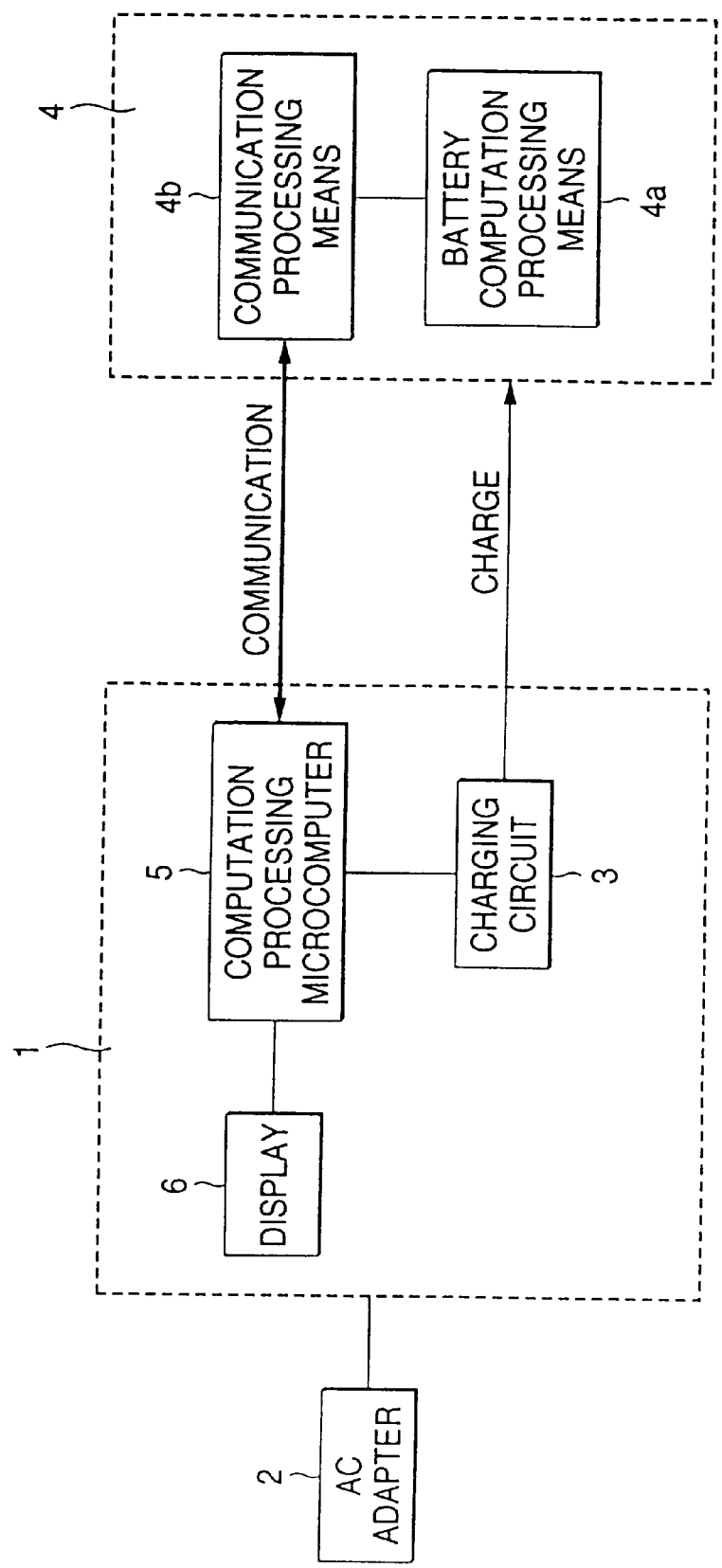
FIG. 1 is a diagram showing an structural example of an inventive charging apparatus.

A preferred embodiment of an inventive charging apparatus will be explained below with reference to the drawings. FIG. 1 shows an example in which the inventive charging apparatus is built into a video camera, i.e., an electronic equipment. In FIG. 1, the charging apparatus 1 is built into the video camera and an AC adapter 2 for supplying power to the video camera and the charging apparatus 1 is connected to a commercial power supply. It is noted that the structure of the video camera is known in the related art technology, so that its detailed explanation will be omitted here.

The charging apparatus 1 has a charging circuit 3 for charging a battery cell 20 of a battery pack 4 for driving the video camera in carrying it. The charging circuit 3 is constructed in the same manner with the related art ones. The battery pack 4 has battery computation processing means 4a for obtaining information at least on detected voltage of the battery cell and on a quantity of accumulated charging current and communication processing means 4b for communicating such information.

Figure 2:
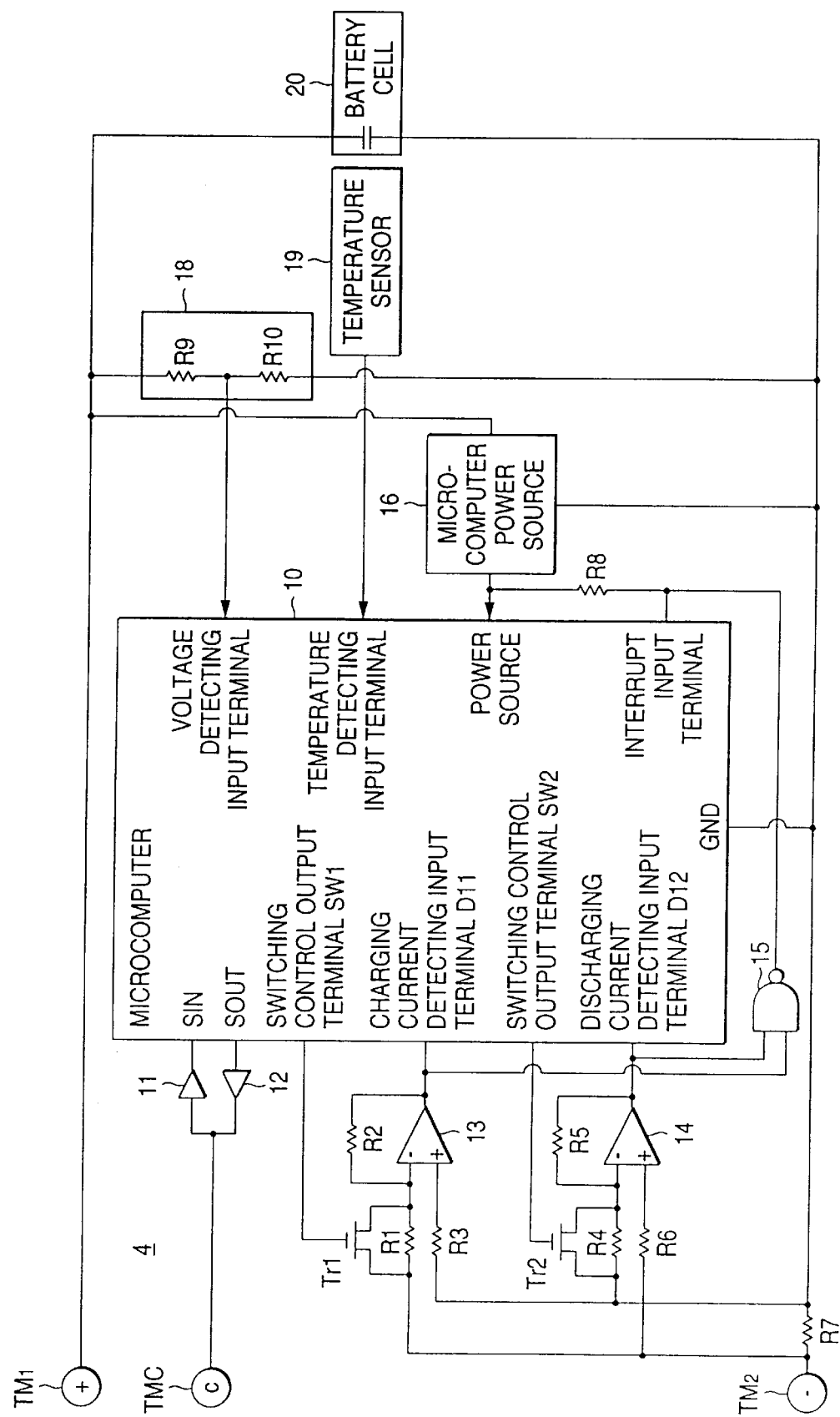
FIG. 2 is a diagram showing an structural example of a battery pack.

FIG. 2 shows an exemplary structure of the battery pack 4. As shown in the figure, a positive electrode of the battery cell 20 of the battery pack 4 is connected to a plus terminal $TM_1$ of the battery pack 4 and a negative electrode of the battery cell 20 is connected to a minus terminal $TM_2$ of the battery pack 4 via a current detecting resistor $R_7$. The plus terminal $TM_1$ and the minus terminal $TM_2$ are connected to plus and minus terminals of the output side of the charging circuit 3 in the charging apparatus 1.

A microcomputer 10 built in the battery pack 4 is supplied with and is operated by power from a microcomputer power source 16 containing a series regulator, a reset circuit and others. A charging current detecting input terminal D11 of the microcomputer 10 is connected with an output terminal of an operational amplifier 13 provided to detect a charging current and a discharging current detecting input terminal D12 is connected with an output terminal of an operational amplifier 14 provided to detect a discharging current. An interrupt input terminal of the microcomputer 10 is connected with an output terminal of a two-input NAND gate 15 whose two input terminals are connected with the respective output terminals of the operational amplifiers 13 and 14 and whose output terminal is connected with a power supply terminal via a pull-up resistor $R_8$ for example. A temperature detecting input terminal of the microcomputer 10 is connected with an output terminal of a temperature sensor 19 for detecting ambient temperature of the battery cell 20, a voltage detecting input terminal thereof is connected with an output terminal of a voltage detecting circuit 18 for detecting terminal voltage of the battery cell 20, a ground terminal thereof is connected with the negative electrode of the battery cell 20 and input/output terminals TMC for communicating with a computation processing microprocessor 5 composing computing means of the charging apparatus 1 described later are connected with buffer amplifiers 11 and 12. It is noted that the terminals to which inputs are made in analog such as the charging current detecting input terminal D11, the discharging current detecting input terminal D12, the temperature detecting input terminal and the voltage detecting input terminal are all A/D input ports and accordingly, the microcomputer 10 contains an A/D converter for converting those analog inputs into digital inputs.

The voltage detecting circuit 18 comprises a voltage dividing resistor composed of resistors $R_9$ and $R_{10}$ to detect inter-terminal voltage of the battery cell 20. A value of the voltage detected by the voltage detecting circuit 18 is supplied to the above-mentioned voltage detecting input terminal of the microcomputer 10. Accordingly, the microcomputer 10 can know the inter-terminal voltage of the battery cell 20 based on the detected value of the voltage from the voltage detecting circuit 18 supplied to the voltage detecting input terminal of the microcomputer 10.

The temperature sensor 19 composed of the temperature detecting thermistor for example is disposed in the vicinity of or in contact with the battery cell 20. Temperature detected by the temperature sensor 19 is supplied to the temperature detecting input terminal of the microcomputer 10. Accordingly, the microcomputer 10 can know the temperature of the battery cell 20 based on the detected temperature supplied to the temperature detecting input terminal.

An non-inverting input terminal of the operational amplifier 13 is connected with the negative electrode of the battery cell 20 via a resistor $R_3$ and the current-voltage detecting resistor $R_7$ and an inverting input terminal thereof is connected with a negative feedback resistor $R_2$ for setting an amplifier gain and a resistor $R_1$. Accordingly, the operational amplifier 13 outputs a voltage obtained by amplifying the value of current (current flowing during charging) flowing within the battery pack 4 corresponding to a ratio of values of resistance of the resistors $R_1$ and $R_2$ ($R_2/R_1$) from the output terminal thereof. Meanwhile, an non-inverting input terminal of the operational amplifier 14 is connected with the negative electrode of the battery cell 20 via a resistor $R_6$ and the current detecting resistor $R_7$ and an inverting input terminal thereof is connected with a negative feedback resistor $R_5$ and a resistor $R_4$. Accordingly, the operational amplifier 14 outputs a voltage obtained by amplifying the value of current (current flowing during charging) flowing within the battery pack 4 and corresponding to a ratio of values of resistance of the resistors $R_4$ and $R_5$ ($R_5/R_4$) from the output terminal thereof.

A transistor switch Tr1 is composed of a field effect transistor for example whose gate is connected with a switching control output terminal SW1 of the microcomputer 10 and to which the resistor $R_1$ is connected between a drain and a source thereof. Accordingly, when the level of a signal from the switching control output terminal SW1 of the microcomputer 10 turns to high (H) for example, the above-mentioned transistor switch Tr1 turns ON. Thereby, the resistance of the resistor $R_1$ becomes almost zero (only internal resistance of the transistor switch Tr1 remains), thus increasing the amplifier gain of the operational amplifier 13 which is set corresponding to the ratio of resistance of the resistors $R_1$ and $R_2$ ($R_2/R_1$). When the level of the signal from the switching control output terminal SW1 of the microcomputer 10 turns to low (L) for example on the other hand, the transistor switch Tr1 turns OFF. Thereby, the amplifier gain of the output terminal 13 assumes a value corresponding to the ratio of resistance of the resistors $R_1$ and $R_2$ ($R_2/R_1$), i.e., an amplifier gain which is smaller than that when the transistor switch Tr1 is ON. Similarly to that, the transistor switch Tr2 is also composed of a field effect transistor for example whose gate is connected with a switching control output terminal SW2 and to which the resistor $R_4$ is connected between a drain and a source thereof. Accordingly, when the level of a signal from the switching control output terminal SW2 of the microcomputer 10 turns to high (H) for example, the above-mentioned transistor switch Tr2 turns ON. Thereby, the resistance of the resistor $R_4$ becomes almost zero (only internal resistance of the transistor switch Tr2 remains), thus increasing the amplifier gain of the operational amplifier 14. When the level of the signal from the switching control output terminal SW2 of the microcomputer 10 turns to low (L) for example on the other hand, the transistor switch Tr2 turns OFF. Thereby, the amplifier gain of the output terminal 14 is reduced.

Here, the microcomputer 10 always monitors the levels of the charging current detecting input terminal D11 and the discharging current detecting input terminal D12 during the normal operation mode (Run time) and turns the levels of the both switching control output terminals SW1 and SW2 to low when the levels of those terminals D11 and D12 are equal to or greater than a certain level. Thereby, the transistor switches Tr1 and Tr2 are both turned OFF and the amplifier gain of the operational amplifiers 13 and 14 are reduced. Accordingly, the microcomputer 10 can measure the value of current flowing through the battery pack 4 (value of current flowing during the charge/discharge) by using the values outputted from the operational amplifiers 13 and 14 whose amplifier gain has been reduced. Accordingly, it is possible to calculate a value of accumulated charging current/discharging current by finding the value of current flowing during the charge/discharge.

Data on the battery cell voltage V, the charging current I, the quantity of accumulated charging current Q, the temperature dependent coefficients h1(T) and h2(T) are supplied from the battery pack 4 to the computation processing microcomputer 5 which composes the computing means of the charging apparatus 1 in the present embodiment.

Data of power consumption W of the video camera using the battery pack 4 is also supplied to the computation processing microprocessor 5.

Figure 4:
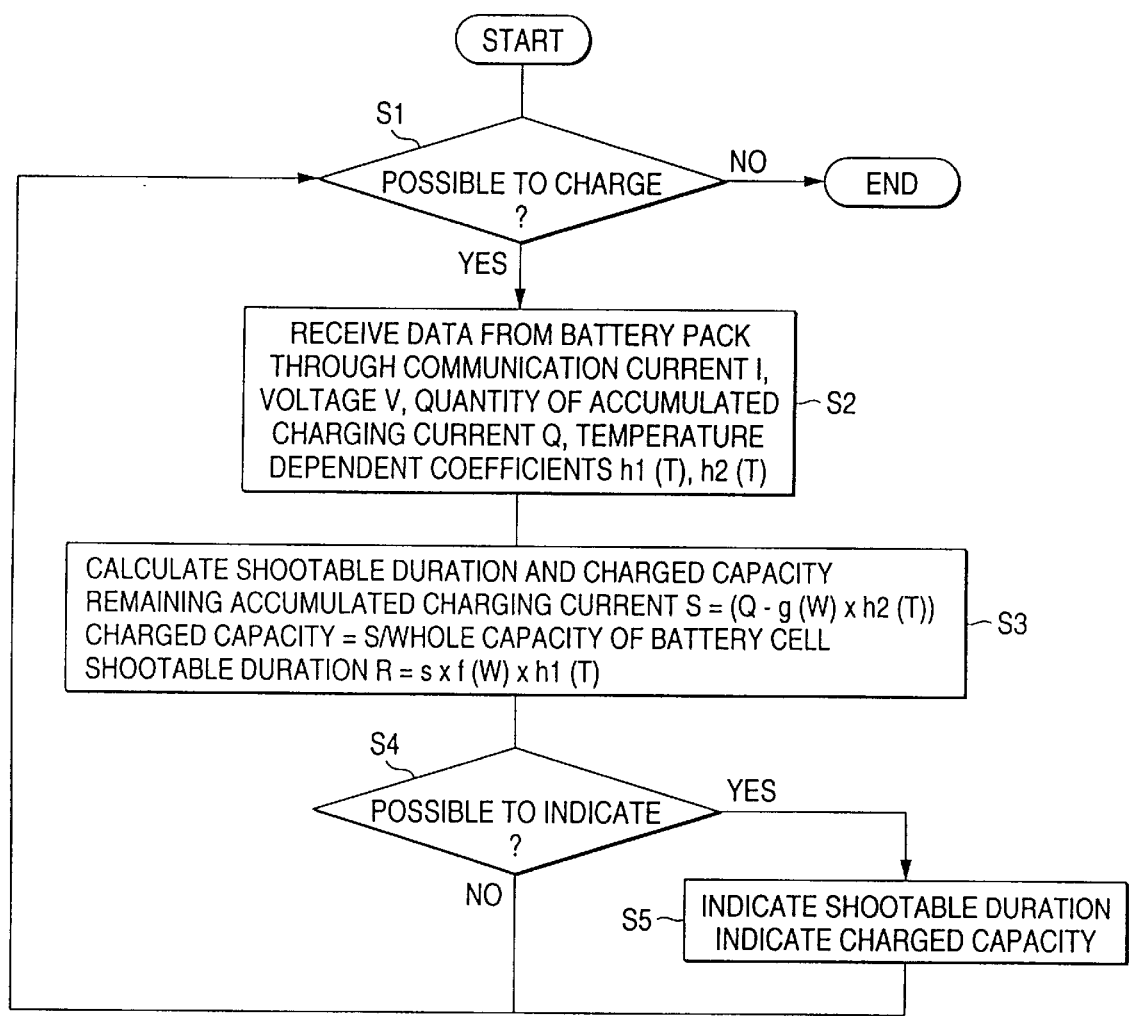
FIG. 4 is a flowchart for explaining the invention.

The computation processing microprocessor 5 operates in accordance to a flowchart shown in FIG. 4 to calculate the charged capacity of the battery cell 20 of the battery pack 4 being charged and an usable duration of the video camera using the battery pack 4 and to indicate them on the display unit 6 as described below.

Figure 3:
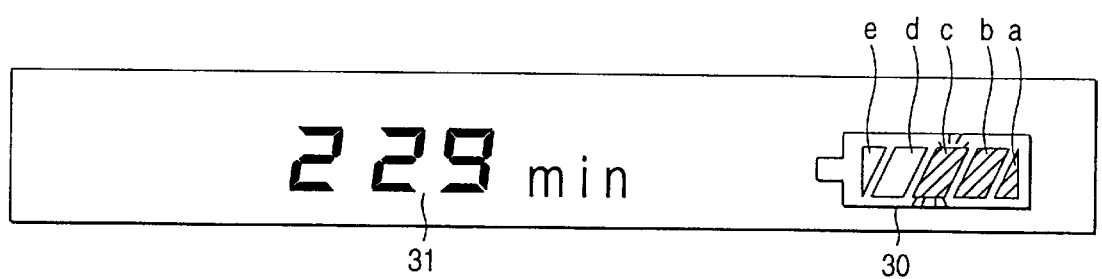
FIG. 3 is a diagram showing exemplary indications.

A charged capacity indicator 30 on the display unit 6 is composed of five stages of a, b, c, d and e for example and is arranged so as to flash the uppermost stage as shown in FIG. 3. For instance, the indicator a flashes when the charged capacity is 0 to 20%, the indicator a lights up and the indicator b flashes when the charged capacity is 20 to 40%, the indicators a and b light up and the indicator c flashes when the charged capacity is 40 to 60%, the indicators a, b and c light up and the indicator d flashes when the charged capacity is 60 to 80%, the indicators a, b, c and d light up and the indicator e flashes when the charged capacity is 80 to 100% and the indicators a, b, c, d and e light up when the charged capacity is equal to or greater than 100%.

The usable duration of the video camera using the battery pack 4 being charged by the present charged capacity is indicated by numerals as an indicator 31 on the display unit 6 as shown in FIG. 3, e.g., 229 min.

Next, an example of the present embodiment in charging the battery cell 20 of the battery pack 4 by the charging apparatus 1 of the present embodiment will be explained in accordance to the flowchart in FIG. 4.

At first, power is supplied to the charging apparatus 1 of the video camera from the AC adaptor 2 and the battery pack 4 to be charged is attached to the predetermined position of the video camera. At this time, the computation processing microcomputer 5 judges whether or not the attached battery pack is chargeable in Step S1. When it is a dry battery for example and is not chargeable, the charge is finished.

When the attached battery pack 4 is chargeable, charging current is supplied to the battery cell 20 of the battery pack 4 from the charging circuit 3 of the charging apparatus 1 and then the process advances to Step S2. In Step S2, the computation processing microcomputer 5 of the charging apparatus 1 receives data on the battery cell voltage V, the charging current I, the quantity of accumulated charging current Q and the temperature dependent coefficients h1(T) and h2(T) sent from the battery pack 4. Data on the power consumption W of the video camera is also stored in a memory provided in the computation processing microcomputer 5.

Next, the process advances to Step S3 to calculate a charged capacity and a duration shootable by the present charged capacity. The charged capacity may be found by the rate between the remaining quantity of accumulated charging current S found by the following expression and the whole capacity of the battery cell 20:

Remaining Quantity of Accumulated Charged Current S=(Q−g(W)×h2(T))

where, g(W) is a quantity of accumulated discharge from the operable minimum voltage of the video camera to the full discharge of the battery cell 20 and is dependent on the power consumption W.

At this time, the remaining quantity of accumulated charging current S may be calculated as follows when the temperature dependency is not taken into account:

S=Q−g(W)

Charged Capacity=S/Whole Capacity of Battery Cell

The shootable duration by the present charged capacity being charged may be found by the following expression, i.e., by multiplying the remaining quantity of accumulated charging current S by the temperature coefficient h1(T):

Shootable Duration R=S×f(W)×h1(T)

where, f(W) is a coefficient for converting the remaining quantity of accumulated charging current Q into the shootable duration and is dependent on the power consumption W of the video camera.

When the temperature dependency is not taken into account in this case, the shootable duration R becomes as follows:

R=S×f(W)

Next, it is judged whether or not the calculated charged capacity and the shootable duration can be indicated in Step S4. When it is possible to indicate them, the charged capacity and the shootable duration are indicated like the indications 30 and 31 on the display unit 6 of the charging apparatus 1. The above-mentioned processes are repeated until the end of the charge.

As described above, the invention is constructed such that the computation processing microcomputer 5 of the charging apparatus 1 calculates the present charged capacity of the battery cell 20 being charged and the shootable duration of the video camera using the battery pack 4 by the present charged capacity and displays them on the display unit 6, the user can readily know the present charged capacity of the battery cell 20 being charged and the shootable duration of the video camera using the battery pack 4 being charged by the present charged capacity and can use the video camera conveniently.

It is noted that although the embodiment in which the inventive charging apparatus 1 is set in the video camera has been described above, the charging apparatus 1 may be set in another electronic equipment or the charging apparatus 1 may be provided separately from an electronic equipment.

Although the charged capacity has been indicated in five stages in the embodiment described above, it is needless to say that it may be indicated continuously or in another way.

Accordingly, it will be understood readily that the invention is not limited to the embodiment described above and may be arranged in various ways within the scope of the gist of the invention.

What is claimed is:

1. A battery charging apparatus for recharging a battery pack which powers a piece of electronic equipment, comprising:

a charging circuit for charging a battery cell of said battery pack;

computing means which is supplied with information on detected voltage of said battery cell and information on a quantity of accumulated charging current from said battery pack and information on power consumption of said electronic equipment using said battery pack; said computing means monitoring battery charge, even while charging, and calculating, even before the battery is used, a present charged capacity of said battery cell and a usable operating time duration of said electronic equipment on the basis of said present charged capacity; and display means for indicating said present charged capacity and said usable operating time duration calculated by said computing means.

2. The charging apparatus according to claim 1, wherein information on temperature of said battery cell is supplied to said computing means.

3. The charging apparatus according to claim 1, wherein said charged capacity is indicated stepwise on said display means and the uppermost step of the indicator is flashed.

4. An electronic equipment to which a battery pack is attached, comprising:

a charging circuit for charging a battery cell of said battery pack;

computing means which is supplied with information on detected voltage of said battery cell and information on a quantity of accumulated charging current from said battery pack and information on power consumption of said electronic equipment using said battery pack; said computing means monitoring battery charge, even while charging, and calculating, even before the battery is used, a present charged capacity of said battery cell and a usable operating time duration of said electronic equipment on the basis of said present charged capacity; and display means for indicating said present charged capacity and said usable operating time duration calculated by said computing means.

5. The electronic equipment according to claim 4, wherein information on temperature of said battery cell is supplied to said computing means.

6. The electronic equipment according to claim 4, wherein said charged capacity is indicated stepwise on said display means and the uppermost step of the indicator is flashed.

7. The electronic equipment according to claim 4, wherein said electronic equipment is a video camera.

* * * * *